C. TROMMER.
BRACELET.
APPLICATION FILED JUNE 5, 1912.
1,048,234.
Patented Dec. 24, 1912.
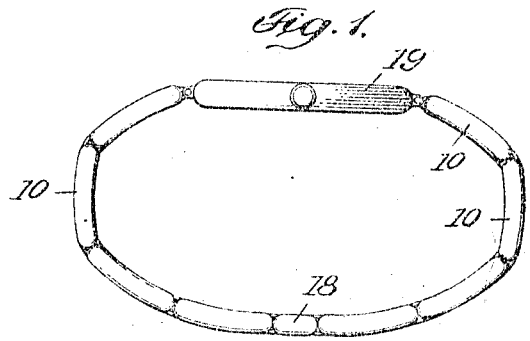
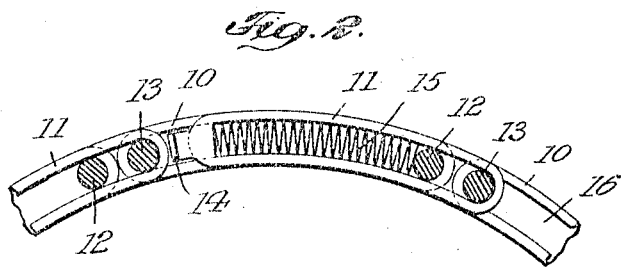
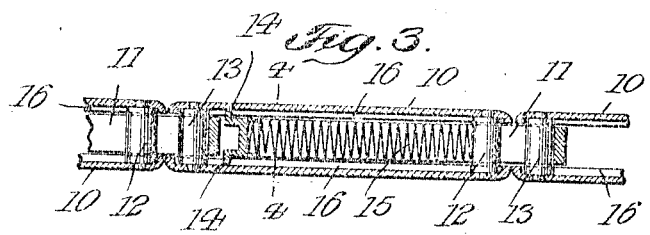
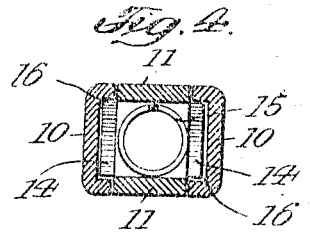
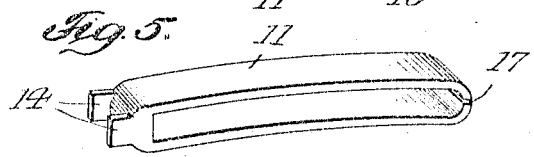
Witnesses:
Inventor
Carl Trommer
By his Attorney

UNITED STATES PATENT OFFICE.

CARL TROMMER, OF NEW YORK, N. Y.

BRACELET.

1,048,234.   Specification of Letters Patent.   Patented Dec. 24, 1912.

Application filed June 5, 1912.   Serial No. 701,928.

*To all whom it may concern:*

Be it known that I, CARL TROMMER, a citizen of Germany, residing at New York city, county of Queens, and State of New York, have invented a new and Improved Bracelet, of which the following is a specification.

This invention relates to an expansible bracelet of novel construction, the units of which may be readily assembled and are not liable to become displaced during the expansion or contraction of the bracelet.

In the accompanying drawing: Figure 1 is a face view of a bracelet embodying my invention; Fig. 2 a longitudinal section through part of the same; Fig. 3 a similar section taken at right angles to Fig. 2; Fig. 4 an enlarged cross section on line 4—4, Fig. 3, and Fig. 5 an enlarged perspective view of one of the inner links, showing it before being embodied into the bracelet.

The bracelet is composed of a series of outer links 10 and a series of spring-influenced inner links 11 that serve to yieldingly connect the outer links. Each of the outer links 10 is composed of a pair of spaced cheeks or side pieces which are connected at each end by a pin 12 and 13, so as to form an oblong unit. This unit while closed at its sides is open at the top and bottom and is preferably of curved form to conform to the shape of the arm. Each inner link 11 also comprises an oblong unit, which is composed of a pair of spaced cheeks, a pair of rounded ends, and a pair of lugs 14 extending from one of said ends. The distance between the two outer faces of these lugs at their junction with the link is equal substantially to the distance between the two outer sides of the link, so that when extending forward, the lugs do not project laterally beyond the link (Fig. 5). Links 11 are of a size to be straddled by links 10 and have a curvature corresponding to that of the latter. The cheeks of links 11 extend however at right angles to those of links 10, so that they form the substance of the outer and inner faces of the completed bracelet, while the latter form the right and left sides thereof. Each link 11 encompasses the pin 12 of one link 10 within which it is housed and projects slightly beyond said pin to snugly encompass with its protruding end the pin 13 of the adjoining link. Within each set of coacting links 10, 11, there is accommodated a spiral spring 15, one end of which enters a socket at the inner end of link 11, while the other end bears against pin 12 of its encompassing link 10, the springs thus tending to draw links 11 into links 10 and to thus contract the latter around the wrist. The inner end of each link 11 is provided with the lugs 14 hereinbefore mentioned which in the finished bracelet are bent outwardly at right angles and engage grooved ways 16 formed on the inner faces of links 10. In this way links 11 are guided by lugs 14 and pins 12 along links 10 during the expansion or contraction of the bracelet, so that all parts permanently retain their proper relative position.

Before assembling the parts, the inner links 11 have the shape shown in Fig. 5. That is to say the outer rounded end of each link is split as at 17, while both lugs 14 extend forwardly the outer faces of the lugs being flush with the sides of the link. The link thus formed is projected with its split end over a pin 12 of one link 10 and also over the pin 13 of a second link 10, the first named link 10 being the one that ultimately houses link 11. Slit 17 is soldered up, link 11 is tilted out of link 10, spring 15 is introduced into link 11, the latter is tilted back into its normal position and the lugs 14 are bent sidewise by a suitable tool to engage the ways 16 of link 10. The above operation is repeated until the entire bracelet is put together.

The drawing shows the bracelet provided with an immovable central member 18, from opposite sides of which project a pair of inner links 11 slidably engaging with their free ends a pair of outer links 10. By this construction, the bracelet expands and contracts from this central member in like manner toward both ends, so that a harmonious effect is obtained. The free ends of the bracelet are shown to carry a watch 19, but it is obvious that the invention may be applied to bracelets other than watch bracelets.

It will be seen that the bracelet constructed as described is of neat appearance, may be readily put together, is freely expansible and that its units will at all times maintain their true relative position. So also when repairs are to be made, lugs 14 may be readily bent forward to become disengaged from ways 16 and permit the inner links to be tilted, so that the springs 15 can be removed and replaced.

I claim:

A bracelet comprising a plurality of grooved outer links, a plurality of inner links connecting adjoining outer links, each inner link being provided at one of its ends with a pair of bendable lugs which engage the outer link, the distance between the outer faces of the lugs at their junction with the inner link being equal substantially to the distance between the outer faces of said link.

CARL TROMMER.

Witnesses:
   FRANK V. BRIESEN,
   KATHERYNE KOCH.